May 23, 1933. H. J. HORN 1,910,164
COMBINED TENSION AND COMPRESSION SPOKE WIRE WHEEL
Filed Sept. 13, 1930
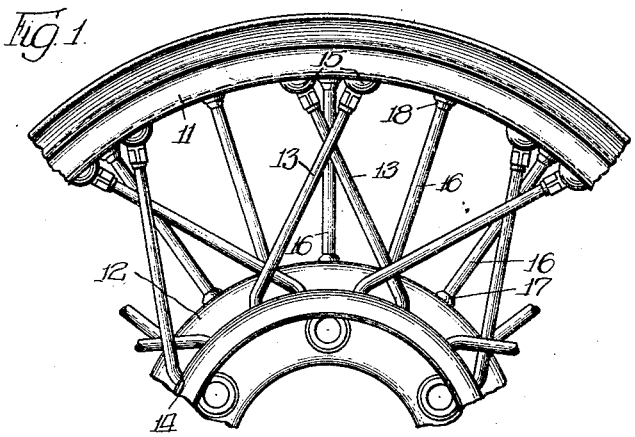
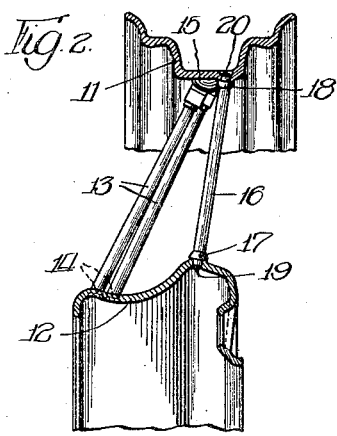
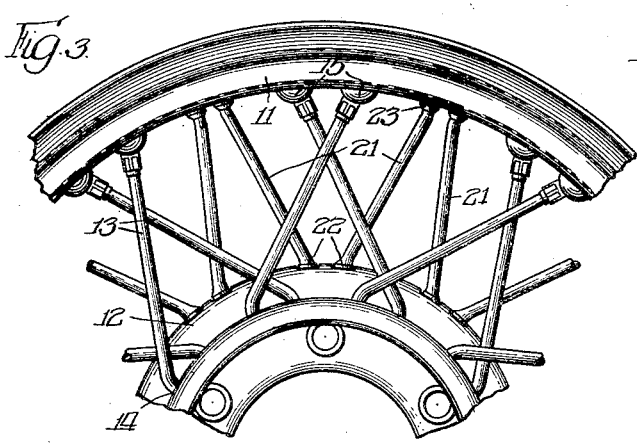
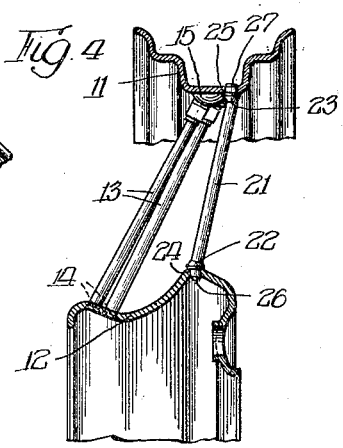
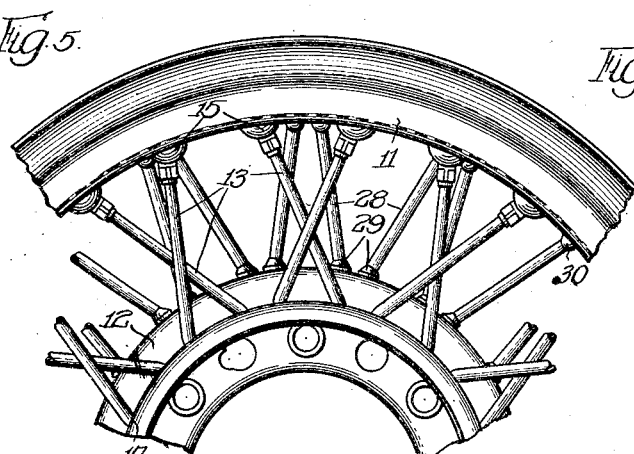
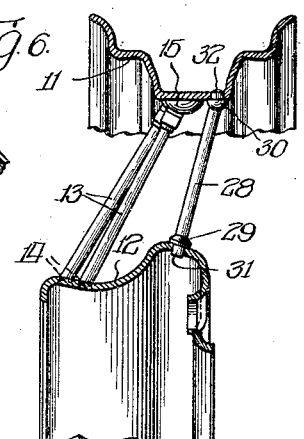
Inventor:
Harry J. Horn,
By Cromwell, Greist & Warden
Attys.

Patented May 23, 1933

1,910,164

UNITED STATES PATENT OFFICE

HARRY J. HORN, OF LANSING, MICHIGAN, ASSIGNOR TO MOTOR WHEEL CORPORATION, OF LANSING, MICHIGAN, A CORPORATION OF MICHIGAN

COMBINED TENSION AND COMPRESSION SPOKE WIRE WHEEL

Application filed Setpember 13, 1930. Serial No. 481,629.

In the construction of wire wheels, lacing is usually such that both the front and rear series of spokes are under tension the spokes of each series being suitably connected as tension members with the hub and rim as by a headed inner end anchored in the hub shell and a welded, riveted or screw nipple engagement of the outer end with the rim.

The spokes are usually so disposed as to cross intermediate the rim and hub, the rear series leading from the rear of the rim to a point of anchorage near the front of the hub and the front series leading from the front of the rim to a point of anchorage near the rear of the hub.

This intersecting or crossed arrangement of the two spoke series enables tension spoke wheels to maintain the tread plane or center line of the rim in nearer to the side of the car than could be established by using the multiple series of tension spokes without crossing, but even so the tread plane is so forward away from the car as to make difficult the interchange on the same hub of wood or disk wheels.

By the present invention the spokes are disposed in two series; preferably the front series carrying its share of the load in tension and the rear series in compression; the spokes of the two series preferably do not cross, although the individual spokes in a series may; both series extend from the rim towards the axle at a forward inclination, the rear series being disposed at a more acute angle to the wheel plane; the front series being under tension and the rear series under compression; the rear series at the rim and at the hub presenting an abutment, whereby the tensioning of the front series serves to subject the rear series to compression in corresponding degree. Among the resultant advantages are simplicity of assembly, of spoke tightening and of wheel alignment; the bringing of the tread plane in nearer the car body, thus facilitating wheel interchange of different types; reduction of spoke cost as to the compression series; and many other advantages which will appear to those skilled in the art.

The spokes of the compression series may be disposed radially, or they may be staggered only, or they may cross and also be staggered, depending upon the design approve to carry more or less of the torque load.

In order that the invention may be readily understood by those skilled in the art, preferred and modified embodiments of the same are set forth by way of illustration only in the description following and in the accompanying drawing wherein Fig. 1 is a fragmentary front view of a wheel embodying radially disposed straight compression spokes;

Fig. 2 is a radial section through the wheel of Fig. 1;

Fig. 3 is a view similar to Fig. 1 but embodying staggered bent compression spokes;

Fig. 4 is a radial section through the wheel of Fig. 3;

Fig. 5 is a view similar to Figs. 1 and 3 but embodying staggered straight compression spokes with deflected tips; and Fig. 6 is a radial section through the wheel of Fig. 5.

Having reference for illustrative purposes to the drawing, there is shown at 11 a standard rim of the drop base type and at 12 an approved hub shell. The drop base of the rim at approximately its medial line is connected by a front series of tension spokes 13 with the forward portion of the hub shell. The inner ends of these spokes are in the usual manner headed over to engage within apertures of the hub shell at 14 while the outer ends of the spokes are screw-threaded and supplied with nipples (not shown) in the usual manner at 15. This front series of tension spokes, as is not uncommon, are staggered and cross each other as most clearly shown in Figs. 1, 3 and 5 whereby to sustain and transmit the torque load. Not only are the front series of spokes 13 preferably staggered and crossed, but they are also disposed at an inclination to the wheel plane, extending inwardly and forwardly from their connection with the rim to their connection with the hub.

As distinguished from the front series of tension spokes, the rear series, according to the present invention, do not act as tension members. They are not headed into either the hub or the rim, nor are they provided with nipples whereby tension may be exerted. On the contrary, they are shown as loosely seated within apertures of the rim 11 and hub shell 12, being held in place only by tension of the front series.

According to Figs. 1 and 2 the compression series of spokes 16 are straight throughout their length and disposed radially of the wheel. Each spoke is provided adjacent its inner and outer ends with shoulders 17 and 18 which serve as abutments to take the load, while tips 19 and 20 serve to position the ends of the spokes within apertures of the hub shell and rim respectively.

According to Figs. 3 and 4 compression spokes 21 are staggered and in order to compensate for the staggered relation these spokes at 22 and 23 are slightly deflected and the bearing faces of the shoulders 24 and 25 are inclined to the axis of the spoke to present a flat bearing against the opposed faces of the hub shell and rim, the tips 26 and 27 being sufficiently deflected to seat radially within the hub shell and rim.

According to Figs. 5 and 6 compression spokes 28 throughout their length, including the shoulders 29 and 30, are straight. The bearing faces of the shoulders are inclined to the spoke axis as described with reference to Figs. 3 and 4, and the tips 31 and 32 are sufficiently deflected to enter the hub shell and rim radially.

Satisfactory results follow from the method of lacing wheels herein set forth, including a front series of tension spokes and a rear series of compression spokes even though the spokes of the rear series be of no heavier gauge than those of the front series, but for some purposes it is found to be desirable to increase slightly the gauge of the compression spoke series as compared with the tension series. It may also be found desirable to dispose the spokes of the compression series in other relations to each other than those illustrated, the characteristic feature of the invention being the employment in cooperative relation of front and rear series of tension and compression spokes, occupying an inclined relation to each other and to the wheel plane, whereby tensioning of one series will place the other series under compression.

I claim:

1. In a wheel, a multiple series of spokes of like character, certain series arranged to carry the load in tension and certain other series in compression.

2. In a wheel, a front series of spokes arranged to carry the load in tension and a rear series of like spokes in compression.

3. In a wheel, front and rear series of spokes of like character, the front series arranged to carry the load in tension and the rear series in compression, the two series extending from the rim to the hub along forwardly and inwardly diverging lines oblique to the wheel plane.

4. In a wheel, front and rear series of spokes, the front series arranged to carry the load in tension and the rear series in compression, the two series extending from the rim to the hub along forwardly diverging lines oblique to the wheel plane, the two series at the rim being close together and at the hub more widely separated.

5. In a wheel, front and rear series of spokes extending from axially spaced points on the rim inwardly and towards the front but along diverging lines to more widely spaced points on the hub, the rear series disposed at a more acute angle to the wheel plane than the front series, the spokes of one series arranged to carry the load in tension and the other series in compression.

6. In a wheel, a front series of spokes extending from approximately the center line of the rim to the front of the hub at an oblique angle to the wheel plane and a rear series extending from points on the rim at the rear of the center line to the hub at a more acute angle and terminating at the rear of the front series, the front series arranged to carry the load in tension and the rear series in compression.

7. In a wheel, front and rear series of spokes extending from axially spaced points on the rim inwardly and towards the front but along diverging lines to more widely spaced points on the hub, the rear series disposed at a more acute angle to the wheel plane than the front series, the spokes of one series arranged to carry the load in tension and the other series in compression, the front series being crossed and staggered and the rear series extending radially.

8. In a wheel, front and rear series of spokes extending from axially spaced points on the rim inwardly and towards the front but along diverging lines to more widely spaced points on the hub, the rear series disposed at a more acute angle to the wheel plane than the front series, the spokes of one series arranged to carry the load in tension and the other series in compression, the spokes of both series being staggered.

9. In a wheel, front and rear series of spokes extending from axially spaced points on the rim inwardly and towards the front but along diverging lines to more widely spaced points on the hub, the rear series disposed at a more acute angle to the wheel plane than the front series, the spokes of one series arranged to carry the load in tension and the other series in compression, the spokes of both series being staggered to lie at an acute angle to the radius but entering the rim and hub along a substantially radial line.

10. In a wheel, a front series of spokes extending from approximately the center line of the rim to the front of the hub at an oblique angle to the wheel plane and a rear series extending from points on the rim at the rear of the center line to the hub at a more acute angle and terminating at the rear of the front series, the front series arranged to carry the load in tension and the rear series in compression, the spokes of the front series fixedly anchored at the hub and adjustably secured at the rim, the spokes of the rear series having shouldered tips seated loosely in holes of the rim and hub.

11. In a wheel, a multiple series of spokes of like character, certain series tied into the rim and hub as tension members and certain other series seated in the rim and hub as compression members.

12. In a wheel, a multiple series of spokes connecting the rim and hub, the spoke elements of the two series disposed in radially converging planes as viewed in the wheel plane and in intersecting planes as viewed axially of the wheel, the spokes of the front series tied into the rim and hub as tension members and the spokes of the rear series seated in the hub and rim as compression members.

13. In a wheel, a multiple series of wheel spokes connecting the rim and hub, certain of the series arranged to carry the load in tension and other series in compression, the spokes of the tension series anchored at one end and adjustably secured at the other and the spokes of the compression series seated within sockets at both ends.

14. In a wheel, front and rear series of spokes of like character, the front series arranged to carry the load in tension and the rear series in compression, the two series extending from the rim to the hub along forwardly and inwardly diverging lines oblique to the wheel plane, the spokes of the tension series anchored at one end and adjustably secured at the other and the spokes of the compression series seated within sockets at both ends.

In testimony whereof I have hereunto subscribed my name.

HARRY J. HORN.